(12) United States Patent
Hosoe et al.

(10) Patent No.: US 9,180,864 B2
(45) Date of Patent: Nov. 10, 2015

(54) HYBRID VEHICLE

(75) Inventors: Yukihiro Hosoe, Hammatsu (JP); Yoshiki Ito, Hamamatsu (JP); Masaaki Tagawa, Hamamatsu (JP); Hitoshi Ohkuma, Hamamatsu (JP)

(73) Assignee: SUZUKI MOTOR CORPORATION, Hamamatsu-shi, Shizuoka (JP)

( * ) Notice: Subject to any disclaimer, the term of this patent is extended or adjusted under 35 U.S.C. 154(b) by 161 days.

(21) Appl. No.: 13/981,222

(22) PCT Filed: Jan. 31, 2011

(86) PCT No.: PCT/JP2011/051910
§ 371 (c)(1),
(2), (4) Date: Oct. 4, 2013

(87) PCT Pub. No.: WO2012/104962
PCT Pub. Date: Aug. 9, 2012

(65) Prior Publication Data
US 2014/0025243 A1   Jan. 23, 2014

(51) Int. Cl.
*B60W 20/00* (2006.01)
*B60W 10/26* (2006.01)
(Continued)

(52) U.S. Cl.
CPC ............... *B60W 20/00* (2013.01); *B60K 6/445* (2013.01); *B60W 10/06* (2013.01); *B60W 10/26* (2013.01); *B60W 20/106* (2013.01); *B60W 20/40* (2013.01);
(Continued)

(58) Field of Classification Search
CPC ... B60W 20/00; B60W 20/106; B60W 20/40; B60W 10/06; B60W 10/26; B60W 2510/244; Y10S 903/93; Y02T 10/6239; B60K 6/445

USPC ............ 701/22; 903/930; 320/109, 134; 123/179.3; 180/65.4; 477/99; 290/37 A
See application file for complete search history.

(56) References Cited

U.S. PATENT DOCUMENTS

| 6,018,199 A * | 1/2000 | Shiroyama et al. | 290/37 A |
|---|---|---|---|
| 7,928,690 B2 * | 4/2011 | Koch et al. | 320/108 |
| 2007/0029119 A1 * | 2/2007 | Syed et al. | 180/65.2 |

(Continued)

FOREIGN PATENT DOCUMENTS

| JP | 11-165540 | 6/1999 |
|---|---|---|
| JP | 3304777 B2 * | 7/2002 |
| JP | 2004-282999 | 10/2004 |

OTHER PUBLICATIONS

Form PCT/ISA/210 International Search Report with English translation mailed Apr. 12, 2011 (3 pages).

*Primary Examiner* — Tuan C. To
(74) *Attorney, Agent, or Firm* — Flynn, Thiel, Boutell & Tanis, P.C.

(57) ABSTRACT

A hybrid vehicle includes: a charge state calculator which calculates a charge state of an electricity storer; a standard opening and closing device which turns off a contactor when the charge state calculated by the charge state calculator is lower than a standard lower-limit value; and an engine startup opening and closing device which maintains the contactor in an on state when an engine startup signal is input even when the charge state calculated by the charge state calculator is a value for turning off the contactor, wherein the contactor turning-on operation executed by the engine startup opening and closing device is executed when the charge state calculated by the charge state calculator is higher than an engine startup lower-limit value set lower than the standard lower-limit value by a predetermined value.

2 Claims, 7 Drawing Sheets

(51) Int. Cl.
*B60W 10/06* (2006.01)
*B60K 6/445* (2007.10)

(52) U.S. Cl.
CPC ....... *B60W 2510/244* (2013.01); *Y02T 10/6239* (2013.01); *Y10S 903/93* (2013.01)

(56) References Cited

U.S. PATENT DOCUMENTS

| | | | |
|---|---|---|---|
| 2007/0056784 A1* | 3/2007 | Joe et al. | 180/65.2 |
| 2008/0097661 A1* | 4/2008 | Moran | 701/22 |
| 2009/0152027 A1* | 6/2009 | Kusaka et al. | 180/65.28 |
| 2010/0116235 A1* | 5/2010 | Imamura et al. | 123/179.3 |
| 2010/0185351 A1* | 7/2010 | Uchiyama et al. | 701/22 |
| 2010/0250037 A1* | 9/2010 | Yoshida et al. | 701/22 |
| 2011/0012553 A1* | 1/2011 | Sloan et al. | 320/105 |
| 2011/0166731 A1* | 7/2011 | Kristinsson et al. | 701/22 |
| 2011/0199026 A1* | 8/2011 | Forrest et al. | 315/362 |
| 2011/0215754 A1* | 9/2011 | Tabuta et al. | 320/107 |
| 2011/0215764 A1* | 9/2011 | Takahashi et al. | 320/134 |
| 2011/0218698 A1* | 9/2011 | Bissontz | 701/22 |
| 2011/0241611 A1* | 10/2011 | Watanabe et al. | 320/108 |
| 2012/0072066 A1* | 3/2012 | Kato et al. | 701/22 |
| 2012/0158225 A1* | 6/2012 | Books et al. | 701/22 |
| 2013/0154264 A1* | 6/2013 | Hatanaka et al. | 290/45 |

* cited by examiner

HYBRID VEHICLE

TECHNICAL FIELD

The present invention relates to a hybrid vehicle, and particularly, to a hybrid vehicle which uses an engine and a motor generator as power sources.

More particularly, the invention relates to a hybrid vehicle which protects an electricity storing means capable of exchanging power with a motor generator and improves engine startability.

BACKGROUND ART

Hitherto, there has been proposed a hybrid vehicle equipped with a motor generator other than an engine as a running power source. For example, a hybrid vehicle disclosed in JP 2005-045883 A is known.

In the related art disclosed in this publication, the hybrid vehicle includes a driving high-voltage battery which is an electricity storing means capable of exchanging power with a motor generator and a contactor which enables or disables a connection between the motor generator and the battery, wherein when the SOC (State Of Charge) representing the charge state of the battery becomes smaller than a certain threshold value, the contactor is turned off to completely stop the discharge of the battery, so that degradation of the battery caused by the overdischarge of the battery is prevented.

CITATION LIST

Patent Literature

JP 2005-045883 A

SUMMARY OF INVENTION

Technical Problem

In the related art of PTL 1, the management of the battery after turning off the contactor is not mentioned. However, in the hybrid vehicle, there is a case in which the engine is started after turning off the contactor. For this reason, there is a need to consider the control executed in a case where the SOC of the battery is lower than a threshold value due to a change in voltage or the like when an ignition switch is turned on (Ignition On) to start the engine after the contactor is turned off.

Particularly, in a hybrid vehicle in which an engine and a motor generator are directly connected to each other, like a hybrid vehicle with a power transmitting mechanism, a battery is consumed to drive the motor generator and cranking is performed to start the engine. Regarding the startup of the engine of such a hybrid vehicle, even when the ignition switch is turned on again to start the engine in a case where the SOC is lower than the threshold value which turns off the contactor that is provided to protect the battery, due to a decrease in the SOC and the contactor being turned off, the contactor is turned off again due to a decrease in the SOC caused by cranking. As a result, a problem arises in that the engine may not be started again.

It is an object of the invention to provide a hybrid vehicle capable of starting an engine even when a charge state of an electricity storing means is at a value for turning off a contactor and of protecting the electricity storing means and improving engine startability at the same time.

Solution to Problem

According to the invention, there is provided a hybrid vehicle which outputs power generated from an engine and a motor generator to a drive shaft through a power transmitting mechanism, the hybrid vehicle including: an electricity storing means which exchanges power with the motor generator; a contactor which enables or disables a connection between the motor generator and the electricity storing means; a charge state calculation means which calculates a charge state of the electricity storing means; a standard opening and closing means which turns off the contactor when the charge state calculated by the charge state calculation means is lower than a standard lower-limit value; and an engine startup opening and closing means which maintains the contactor in an on state when an engine startup signal is input even when the charge state calculated by the charge state calculation means is a value for turning off the contactor by the standard opening and closing means, wherein the contactor turning-on operation executed by the engine startup opening and closing means is executed when the charge state calculated by the charge state calculation means is higher than an engine startup lower-limit value which is lower than the standard lower-limit value by a predetermined value.

Advantageous Effects of Invention

According to the invention, since the contactor is maintained in an on state when the engine startup signal is input and the charge state is higher than the engine startup lower-limit value which is lower than the standard lower-limit value even when the charge state of the electricity storing means is a value for turning off the contactor, the engine may be started while suppressing the degradation of the electricity storing means due to a decrease in the charge state being as small as possible. Further, since the invention may start the engine while suppressing the degradation of the electricity storing means due to a decrease in charge state being as small as possible, the electricity storing means may be protected and the engine startability may be improved at the same time.

DESCRIPTION OF EMBODIMENTS

Figure 1:
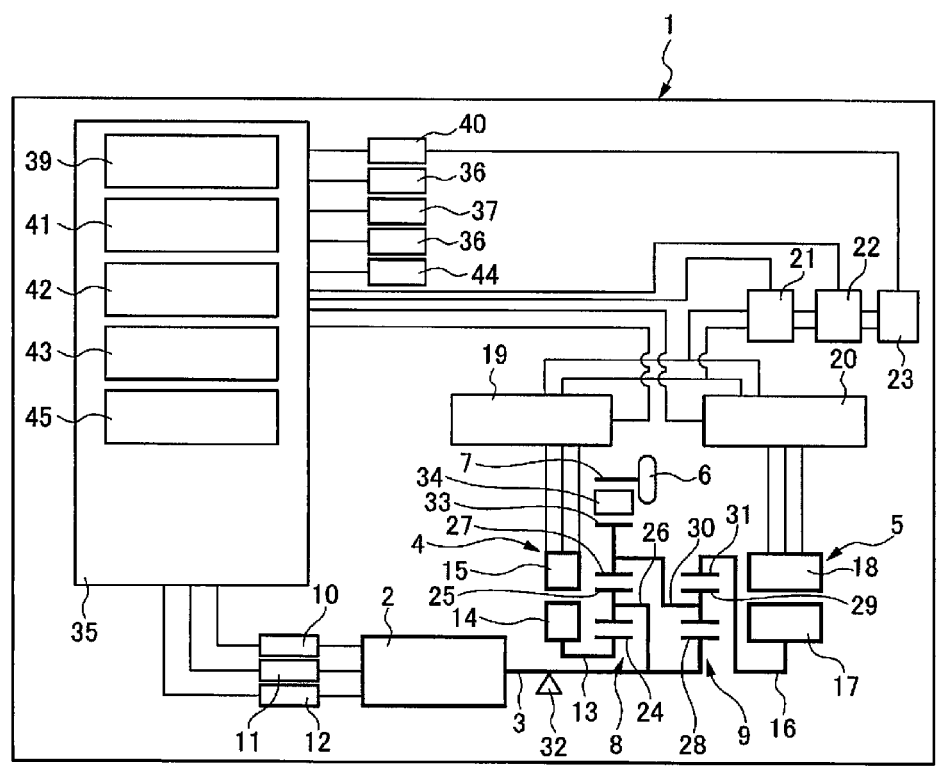
FIG. 1 is a diagram illustrating a system configuration of a hybrid vehicle (Embodiment 1).

Hereinafter, embodiments of the invention will be described by referring to the drawings.

Embodiment 1

FIGS. 1 to 4 illustrate Embodiment 1 of the invention. In FIG. 1, a hybrid vehicle 1 is provided. The hybrid vehicle 1 includes an output shaft 3 of an engine 2 which generates a drive power by the combustion of a fuel, first and second motor generators 4 and 5 which generate a drive power by electricity and are driven to generate electric energy, and a drive shaft 7 which is connected to a drive wheel 6 of the hybrid vehicle 1 as a driving system, and includes first and second planetary gear mechanisms 8 and 9 which are connected to each of the output shaft 3, the first motor generator 4, the second motor generator 5, and the drive shaft 7 as a power transmitting mechanism.

The engine 2 includes an air quantity adjusting means 10 which is a throttle valve that adjusts an air intake amount corresponding to an accelerator opening degree (an accelerator stepping amount), a fuel supply means 11 which is a fuel injection valve that supplies a fuel corresponding to the intake air amount, and an ignition means 12 which is an ignition unit that ignites a fuel. The engine 2 controls the fuel combustion state by the air quantity adjusting means 10, the fuel supply means 11, and the ignition means 12 and generates a drive power by the combustion of the fuel.

The first motor generator 4 includes a first motor rotor shaft 13, a first motor rotor 14, and a first motor stator 15. The second motor generator 5 includes a second motor rotor shaft 16, a second motor rotor 17, and a second motor stator 18. The first motor stator 15 of the first motor generator 4 is connected to a first inverter 19. The second motor stator 18 of the second motor generator 5 is connected to a second inverter 20.

The power supply terminals of the first inverter 19 and the second inverter 20 are connected to a battery 23 through a bi-directional DC-DC converter 21 and a contactor 22. The battery 23 is an electricity storing means that may exchange power with the first motor generator 4 and the second motor generator 5. The contactor 22 enables or disables the connection of the first motor generator 4 and the second motor generator 5 with respect to the battery 23. The amounts of electricity from the battery 23 to the first motor generator 4 and the second motor generator 5 through the DC-DC converter 21 are respectively controlled by the first inverter 19 and the second inverter 20. Here, the first and second motor generators generate a drive power by the supplied electricity, are driven by the drive wheel 6 in a regeneration mode to generate electric energy, and charge the generated electric energy to the battery 23 through the DC-DC converter 21.

The first planetary gear mechanism 8 includes a first sun gear 24, a first planetary carrier 26 which supports a first planetary gear 25 meshing with the first sun gear 24, and a first ring gear 27 which meshes with the first planetary gear 25. The second planetary gear mechanism 9 includes a second sun gear 28, a first planetary carrier 30 which supports a second planetary gear 29 meshing with the second sun gear 28, and a second ring gear 31 which meshes with the second planetary gear 29.

The first planetary gear mechanism 8 and the second planetary gear mechanism 9 have a configuration in which the rotation center lines of the respective rotation components are coaxially disposed, the first motor generator 4 is disposed between the engine 2 and the first planetary gear mechanism 8, and the second motor generator 5 is disposed so as to be away from the engine 2 in the second planetary gear mechanism 9. The second motor generator 5 is capable of causing the hybrid vehicle 1 to run only by the output thereof.

The first motor rotor shaft 13 of the first motor generator 4 is connected to the first sun gear 24 of the first planetary gear mechanism 8. The first planetary carrier 26 of the first planetary gear mechanism 8 and the second sun gear 28 of the second planetary gear mechanism 9 are coupled to each other and are connected to the output shaft 3 of the engine 2 through a one-way clutch 32. The first ring gear 27 of the first planetary gear mechanism 8 and the second planetary carrier 30 of the second planetary gear mechanism 9 are coupled to each other and are connected to an output portion 33. The output portion 33 is connected to the drive shaft 7 through an output transmitting mechanism 34 such as a gear or a chain. The second motor rotor shaft 16 of the second motor generator 5 is connected to the second ring gear 31 of the second planetary gear mechanism 9.

The hybrid vehicle 1 outputs the power generated by the engine 2, the first motor generator 4, and the second motor generator 5 to the drive shaft 7 through the first planetary gear mechanism 8 and the second planetary gear mechanism 9 of the power transmitting mechanism, and drives the drive wheel 6. Further, the hybrid vehicle 1 transmits the drive power from the drive wheel 6 to the first motor generator 4 and the second motor generator 5 through the first planetary gear mechanism 8 and the second planetary gear mechanism 9 of the power transmitting mechanism, generates electric energy, and charges the electric energy to the battery 23.

In this way, the hybrid vehicle 1 transmits and receives the drive power among the engine 2, the first motor generator 4, the second motor generator 5, and the drive shaft 7.

In the hybrid vehicle 1, the air quantity adjusting means 10, the fuel supply means 11, the ignition means 12, the first inverter 19, the second inverter 20, the DC-DC converter 21, and the contactor 22 are connected to a vehicle control unit 35. The vehicle control unit 35 includes an engine control means 39 and is connected with an accelerator opening degree detecting means 36, a vehicle speed detecting means 37, and an engine rotation speed detecting means 38. The engine control means 39 controls the drive power of the engine 2 by controlling the air quantity adjusting means 10, the fuel supply means 11, and the ignition means 12 based on the detection signals of the accelerator opening degree detecting means 36, the vehicle speed detecting means 37, and the engine rotation speed detecting means 38.

Further, the vehicle control unit 35 includes a charge state calculation means 41 and a motor control means 42 and is connected with a battery management means 40 which manages the charge and discharge state of the battery 23. The charge state calculation means 41 calculates the charge state (SOC) of the battery 23 by the signal input from the battery management means 40. The motor control means 42 controls the SOC of the battery 23 by operating the DC-DC converter 21 and the contactor 22 in consideration of the SOC calculated by the charge state calculation means 41.

The vehicle control unit 35 includes a standard opening and closing means 43. The standard opening and closing means 43 turns off the contactor 22 when the SOC calculated by the charge state calculation means 41 is lower than a standard lower-limit value SOC1.

Further, the vehicle control unit 35 includes an engine startup opening and closing means 45 and is connected with an ignition switch 44 which inputs an engine startup signal. The engine startup opening and closing means 45 maintains the contactor 22 in an on state when the engine startup signal is input from the ignition switch 44 even when the SOC calculated by the charge state calculation means 41 is lower than the standard lower-limit value SOC1 at which the contactor 22 is turned off by the standard opening and closing means 43. The turning-on operation of the contactor 22 by the engine startup opening and closing means 45 is executed when the SOC calculated by the charge state calculation means 41 is higher than an engine startup lower-limit value SOC2 that is set to a value lower than the standard lower-limit value SOC1 by a predetermined value A.

Next, the operation will be described.

Figure 2:
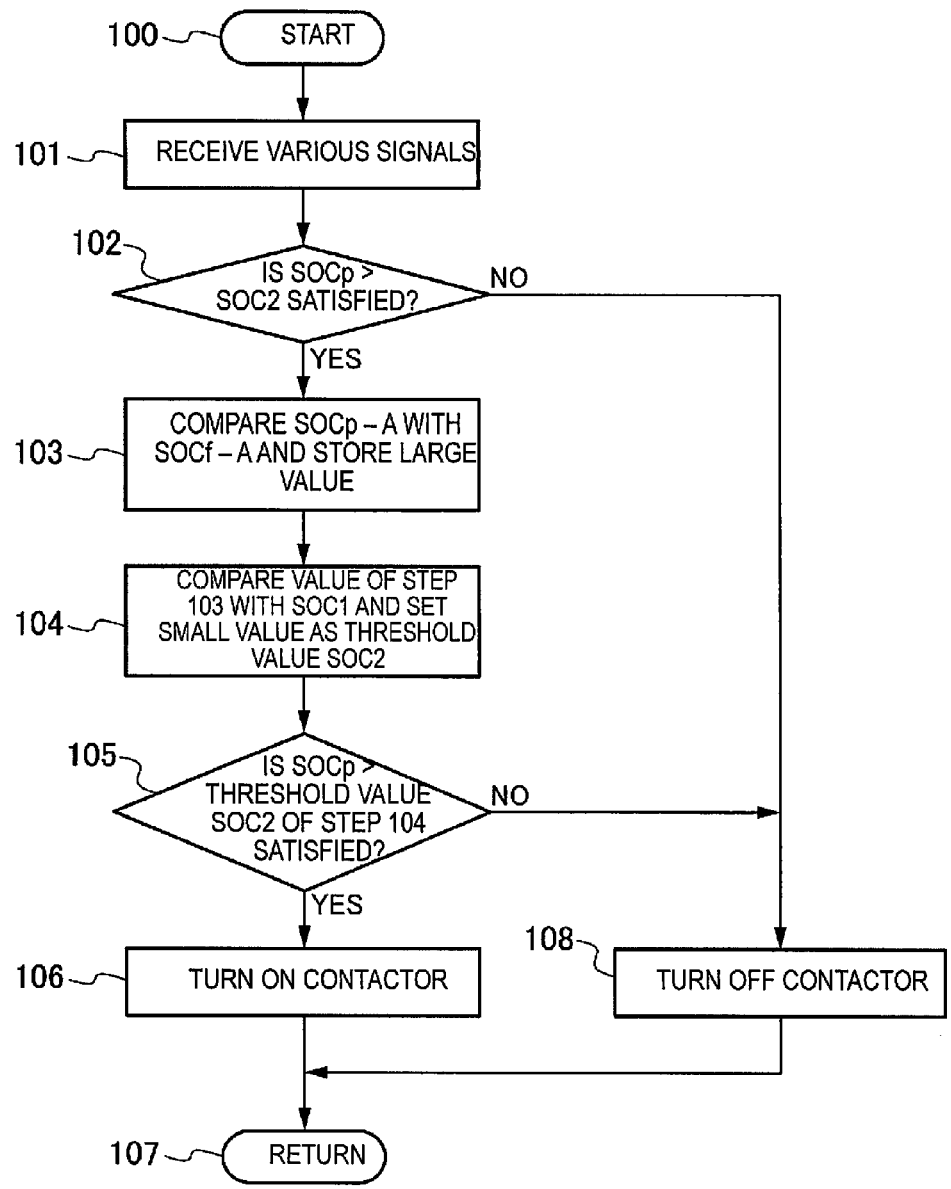
FIG. 2 is a control flowchart when an engine of the hybrid vehicle is started (Embodiment 1).

As illustrated in FIG. 2, the hybrid vehicle 1 executes control by the vehicle control unit 35. Furthermore, the routine illustrated in FIG. 2 is periodically executed.

In FIG. 2, after the contactor 22 is turned off, the ignition switch 44 is turned on (IGON) to start the engine 2, and control is started by the input of the engine startup signal (100), the vehicle control unit 35 receives various signals (the initial SOCf of the battery 23 immediately after turning on the ignition switch 44, the current SOCp of the battery 23, the standard lower-limit value SOC1 for turning off the contactor 22, and the predetermined value A for setting the engine startup lower-limit value SOC2) used in the control (101), and determines whether the current SOCp is larger than the engine startup lower-limit value SOC2 (SOCp>SOC2) (102).

The engine startup lower-limit value SOC2 is a value which is obtained by subtracting the predetermined value A from the current SOCp, and is set to a value lower than the standard lower-limit value SOC1.

When the determination (102) is NO, the contactor 22 is turned off (108), and the routine returns (107) to receive various signals (101). When the determination (102) is YES, a value (SOCp−A) obtained by subtracting the predetermined value A from the current SOCp is compared with a value (SOCf−A) obtained by subtracting the predetermined value A from the initial SOCf, and the large value is stored (103). Then, the calculation result of step 103 is compared with the standard lower-limit value SOC1, the small value is set as the threshold value (the engine startup lower-limit value SOC2) (104), and the routine proceeds to step 105.

In step 105, it is determined whether the current SOCp is larger than the engine startup lower-limit value SOC2 of the threshold value set in step 104 (SOCp>SOC2) (105). When this determination (105) is YES, the contactor 22 is turned on (106), and the routine returns (107) to receive various signals (101). When this determination (105) is NO, the contactor 22 is turned off (108), and the routine returns (107) to receive various signals (101).

Figure 3:
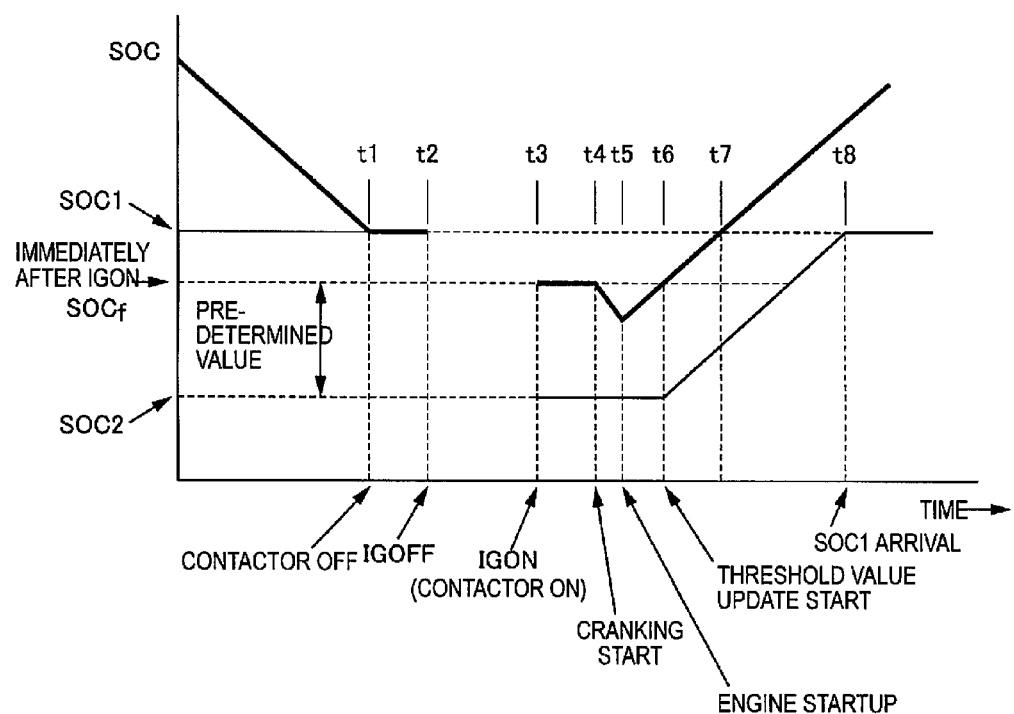
FIG. 3 is a graph illustrating a SOC transition when the engine of the hybrid vehicle is started (Embodiment 1).

As illustrated in FIG. 3, when the SOC decreases and reaches the standard lower-limit value SOC1 (t1), the vehicle control unit 35 turns off the contactor 22 and then turns off the ignition switch 39 (IGOFF) to stop the engine 2 (t2).

When the contactor 22 is turned off and the ignition switch 44 is turned on (IGON) to start the engine 2 (t3), the vehicle control unit 35 simultaneously turns on the contactor 22. When the contactor 22 is turned on, the initial SOCf immediately after turning on the ignition switch 44 is equal to the current SOCp, and the current SOCp is lower than the standard lower-limit value SOC1, a value which is obtained by subtracting the predetermined value A from the current SOCp is set as a threshold value (engine startup lower-limit value SOC2), and the contactor 22 is maintained in an on state instead of an off state as long as the SOCp does not become lower than the engine startup lower-limit value SOC2 of the threshold value.

When the ignition switch 44 is turned on (the contactor 22 is turned on) and the cranking of the engine 2 is started (t4), the current SOCp decreases. However, the current SOCp starts to increase from a time point (t5) at which the startup is completed by the full explosion of the engine 2. The vehicle control unit 35 compares the engine startup lower-limit value SOC2 of the threshold value set as the initial SOCf immediately after turning on the ignition switch 44 with the engine startup lower-limit value SOC2 of the threshold value set by the current SOCp, and starts to update the large value as the engine startup lower-limit value SOC2 of the threshold value (t6). When the current SOCp increases so as to exceed the standard lower-limit value SOC1 (t7) and the engine startup lower-limit value SOC2 as the threshold value reaches the standard lower-limit value SOC1 (t8), the updating of the engine startup lower-limit value SOC2 ends.

Figure 4:
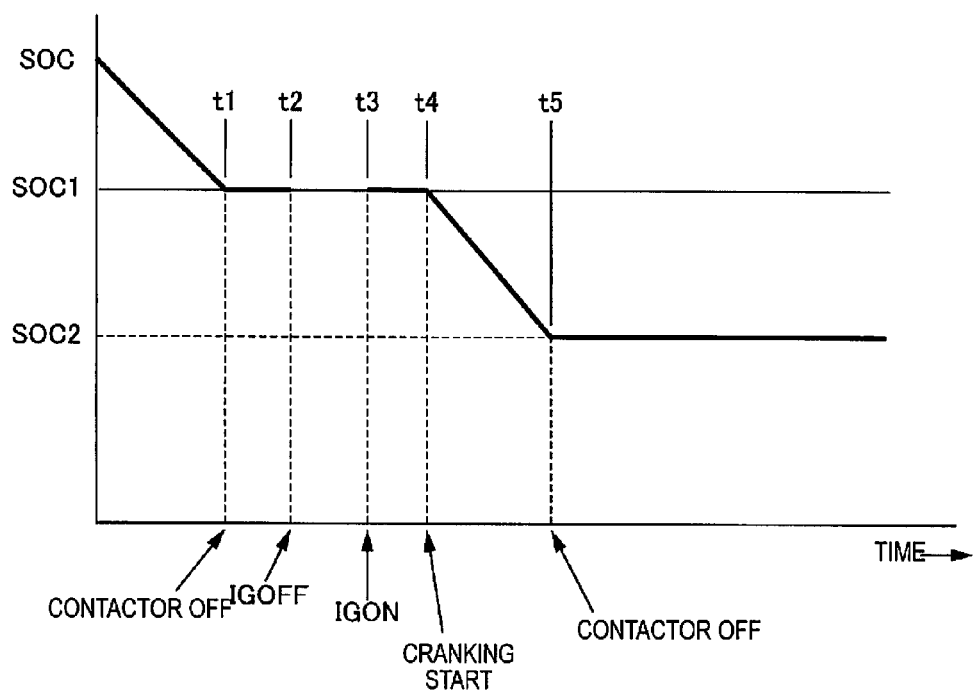
FIG. 4 is a graph illustrating an off state of a contactor by an engine startup lower-limit value when the engine of the hybrid vehicle is started (Embodiment 2).

Furthermore, as illustrated in FIG. 4, if the current SOCp is equal to the standard lower-limit value SOC1 when the SOC decreases and reaches the standard lower-limit value SOC1 (t1), the contactor 22 is turned off to turn off the ignition switch 44 (t2), and the ignition switch 44 is turned on (the contactor 22 is turned on) to start the engine 2 (t3), the vehicle control unit 35 sets a value which is obtained by subtracting the predetermined value A from the current SOCp (the standard lower-limit value SOC1) as the threshold value (the engine startup lower-limit value SOC2).

The vehicle control unit 35 maintains the contactor 22 in an on state instead of an off state as long as the current SOCp does not become lower than the engine startup lower-limit value SOC2 of the threshold value after the cranking of the engine 2 is started (t4). When the engine 2 is not started and the current SOCp decreases and reaches the engine startup lower-limit value SOC2 of the threshold value (t5), the contactor 22 is turned off.

In this way, since the hybrid vehicle 1 maintains the contactor 22 in an on state when the engine startup signal is input by turning on the ignition switch 39 and the current SOCp is higher than the engine startup lower-limit value SOC2 which is lower than the standard lower-limit value SOC1 even when the current SOCp of the battery 23 becomes a value for turning off the contactor 22, the engine 2 may be started while suppressing degradation of the battery 23 due to a decrease in SOC as small as possible.

Further, since the hybrid vehicle 1 may start the engine 2 while suppressing the degradation of the battery 23 due to a decrease in the SOC to be as small as possible, it is possible to protect the battery 23 and to improve the starting performance of the engine 2 at the same time.

Embodiment 2

Figure 5:
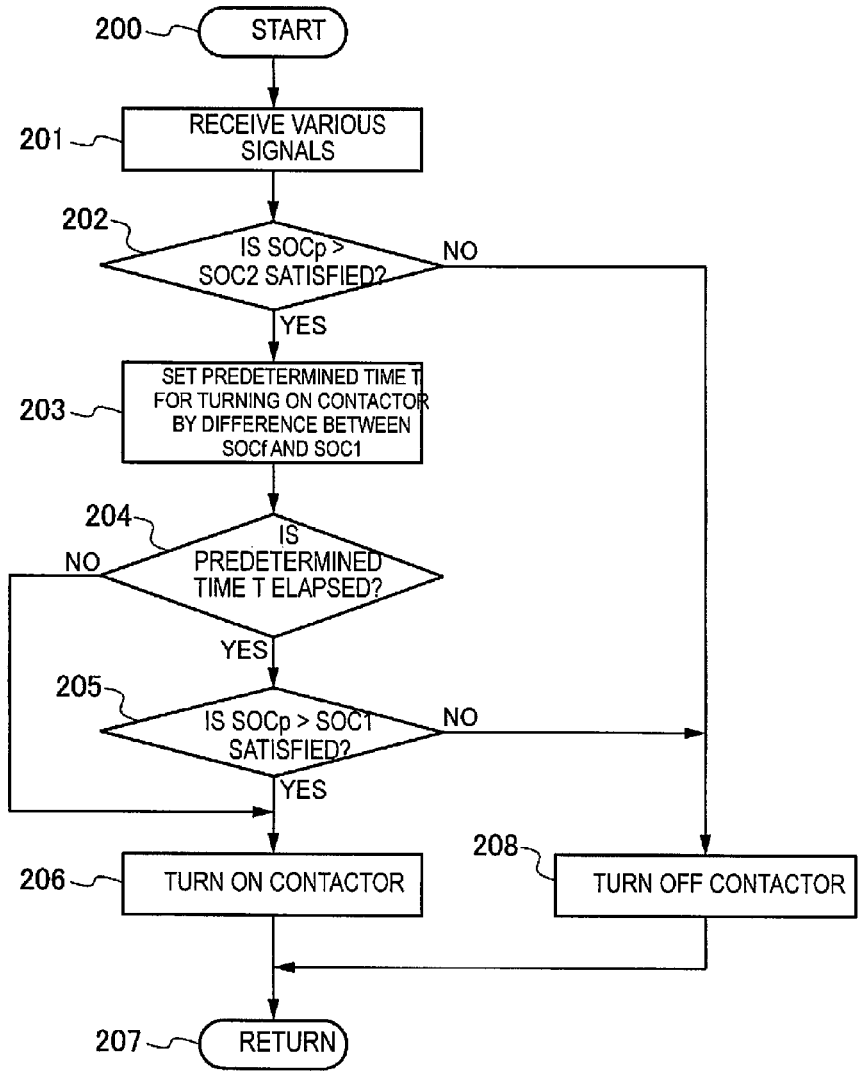
FIG. 5 is a control flowchart when an engine of the hybrid vehicle is started (Embodiment 2).
Figure 6:
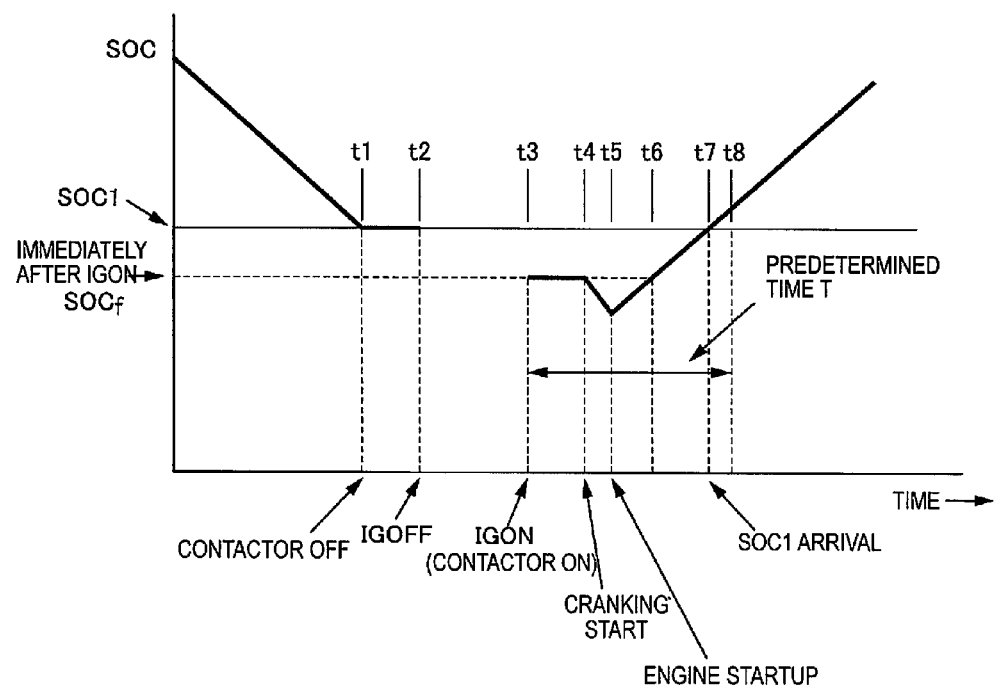
FIG. 6 is a graph illustrating a SOC transition when the engine of the hybrid vehicle is started (Embodiment 2).
Figure 7:
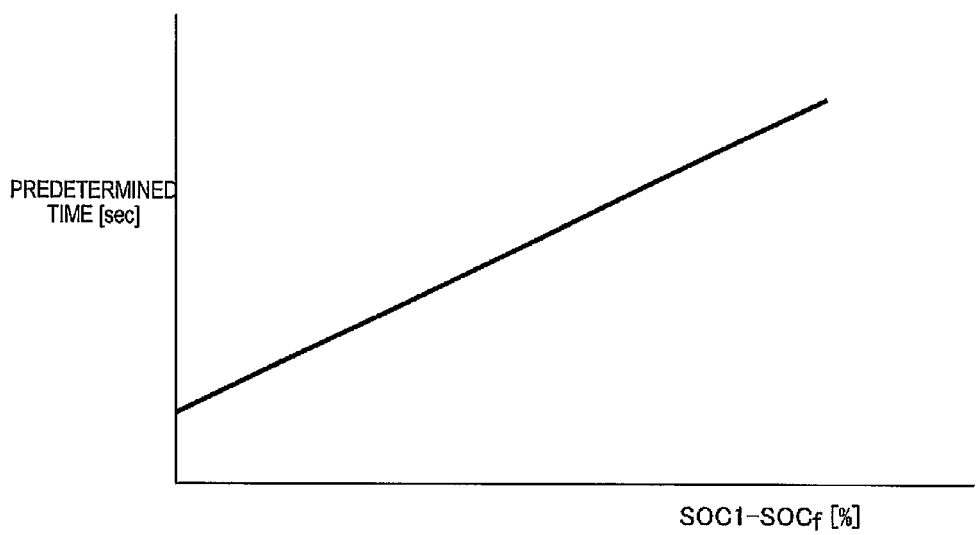
FIG. 7 is a table used to set a predetermined time necessary for exceeding a standard lower-limit value after the engine is started (Embodiment 2).

FIGS. 5 to 7 illustrate Embodiment 2 of the invention. As illustrated in FIG. 1, the hybrid vehicle 1 of Embodiment 2 includes the output shaft 3 of the engine 2 which generates drive power by the combustion of a fuel, the first and second motor generators 4 and 5 which generate drive power by electricity and are driven to generate electric energy, and the drive shaft 7 which is connected to the drive wheel 6 of the hybrid vehicle 1 as the driving system, and includes the first and second planetary gear mechanisms 8 and 9 which are connected to each of the output shaft 3, the first motor generator 4, the second motor generator 5, and the drive shaft 7 as the power transmitting mechanism.

The hybrid vehicle 1 includes the battery 23 which may exchange power with the first motor generator 4 and the second motor generator 5, and includes the contactor 22 which enables or disables the connection of the battery 23 with respect to the first motor generator 4 and the second motor generator 5, where the battery management means 40 which manages the charge and discharge state of the battery 23 is connected to the vehicle control unit 35. The vehicle control unit 35 includes the charge state calculation means 41 which calculates the charge state (SOC) of the battery 23 by the signal input from the battery management means 40, and controls the SOC of the battery 23 by operating the DC-DC converter 21 and the contactor 22 using the motor control means 42. The vehicle control unit 35 includes the standard opening and closing means 43, and turns off the contactor 22 when the SOC calculated by the charge state calculation means 41 is lower than the standard lower-limit value SOC1.

Further, the vehicle control unit 35 includes the engine startup opening and closing means 45 and is connected with the ignition switch 44 which inputs the engine startup signal. The engine startup opening and closing means 45 maintains the contactor 22 in an on state when the engine startup signal is input from the ignition switch 44 even when the SOC calculated by the charge state calculation means 41 becomes a value lower than the standard lower-limit value SOC1 for turning off the contactor 22 by the standard opening and closing means 43. The turning-on operation of the contactor 22 which is executed by the engine startup opening and closing means 45 is stopped to turn off the contactor 22 when the SOC does not exceed the standard lower-limit value SOC1 within a predetermined time T.

Next, the operation will be described.

As illustrated in FIG. 5, the hybrid vehicle 1 executes control by the vehicle control unit 35. Furthermore, the routine illustrated in FIG. 5 is periodically executed.

In FIG. 5, when the contactor 22 is turned off, the ignition switch 44 is turned on (IGON) to start the engine 2, and control is started by the input of the engine startup signal (200), the vehicle control unit 35 receives various signals (the initial SOCf of the battery 23 immediately after turning on the ignition switch 44, the current SOCp of the battery 23, the standard lower-limit value SOC1 for turning off the contactor 22, the predetermined value A for setting the engine startup lower-limit value SOC2, and the predetermined time T necessary for the current SOCp to exceed the standard lower-limit value SOC1 after starting the engine) used in the control (201), and determines whether the current SOCp is larger than the engine startup lower-limit value SOC2 (SOCp>SOC2) (202).

The engine startup lower-limit value SOC2 is a value which is obtained by subtracting the predetermined value A from the current SOCp, and is set to a value lower than the standard lower-limit value SOC1. Further, as illustrated in FIG. 7, the predetermined time T is set as a predetermined time table from a difference between the standard lower-limit value SOC1 and the initial SOCf immediately after starting the engine, and is set to a longer time as the initial SOCf of the battery 23 becomes larger immediately after turning on the ignition switch 44.

When the determination (202) is NO, the contactor 22 is turned off (208), and the routines returns (207) to receive various signals (201). When the determination (202) is YES, the predetermined time T for turning on the contactor 22 by a difference between the standard lower-limit value SOC1 and the initial SOCf is set from the predetermined time table of FIG. 7 (203), and it is determined whether the predetermined time T is elapsed (204).

When this determination (204) is NO, the contactor 22 is turned on (206), and the routine returns (207) to receive various signals (201). When this determination (204) is YES, it is determined whether the current SOCp exceeds the standard lower-limit value SOC1 (205). When this determination (105) is YES, the contactor 22 is turned on (206), and the routine returns (207) to receive various signals (201). When this determination (205) is NO, the contactor 22 is turned off (208), and the routine returns (207) to receive various signals (201).

As illustrated in FIG. 6, when the SOC decreases and reaches the standard lower-limit value SOC1 (t1), the vehicle control unit 35 turns off the contactor 22, and turns off the ignition switch 44 (IGOFF) to stop the engine 2 (t2).

When the contactor 22 is turned off and the ignition switch 44 is turned on (IGON) to start the engine 2 (t3), the vehicle control unit 35 turns on the contactor 22 at the same time. When the contactor 22 is turned on, the initial SOCf immediately after turning on the ignition switch 44 is equal to the current SOCp, and the current SOCp is lower than the standard lower-limit value SOC1, the counting of the predetermined time T set by a difference between the standard lower-limit value SOC1 and the initial SOCf is started from the time at which the ignition switch 39 is turned on, and the contactor 22 is maintained in an on state instead of an off state as long as the SOCp does not become lower than the engine startup lower-limit value SOC2 of the threshold value.

When the ignition switch 44 is turned on (the contactor 22 is turned on) and the cranking of the engine 2 is started (t4), the current SOCp decreases. However, the current SOCp starts to increase from the time point (t5) at which the startup is completed by the full explosion of the engine 2. When the current SOCp exceeds the initial SOCf (t6) and further increases to exceed the standard lower-limit value SOC1 (t7) and the predetermined time T has elapsed (t8), the vehicle control unit 35 turns off the contactor 22.

Furthermore, as illustrated in FIG. 4, if the current SOCp is equal to the standard lower-limit value SOC1 when the SOC decreases and reaches the standard lower-limit value SOC1 (t1), the contactor 22 is turned off to turn off the ignition switch 44 (t2), and the ignition switch 44 is turned on (the contactor 22 is turned on) to start the engine 2 (t3), the vehicle control unit 35 sets a value which is obtained by subtracting the predetermined value A from the current SOCp (the standard lower-limit value SOC1) as the threshold value (the engine startup lower-limit value SOC2).

The vehicle control unit 35 maintains the contactor 22 in an on state instead of an off state as long as the current SOCp does not become lower than the engine startup lower-limit value SOC2 of the threshold value after the cranking of the engine 2 is started (t4). When the engine 2 is not started and the current SOCp decreases and reaches the engine startup lower-limit value SOC2 of the threshold value (t5), the contactor 22 is turned off.

In this way, since the hybrid vehicle 1 maintains the contactor 22 in an on state when the engine startup signal is input by turning on the ignition switch 44, the current SOCf is higher than the engine startup lower-limit value SOC2 which is lower than the standard lower-limit value SOC1, and the time after starting the engine is within the predetermined time T even when the current SOCf of the battery 23 is a value for turning off the contactor 22, the engine 2 may be started while suppressing the degradation of the battery 23 due to a decrease in the SOC being as small as possible.

Further, since the hybrid vehicle 1 may start the engine 2 while suppressing the degradation of the battery 23 due to a decrease in the SOC being as small as possible, it is possible to protect the battery 23 and to improve the startability of the engine 2 at the same time.

Furthermore, since the hybrid vehicle 1 stops the turning-on operation of the contactor 22 to turn off the contactor 22 when the SOC does not exceed the standard lower-limit value SOC1 within the predetermined time T, it is possible to suppress the degradation of the battery 23 to be as small as possible.

INDUSTRIAL APPLICABILITY

The invention may protect the electricity storing means and improve the engine startability at the same time by enabling the startup of the engine, even when the charge state of the electricity storing means becomes a value for turning off the contactor, and may be applied to the hybrid vehicle that uses the engine and the motor generator as drive sources.

REFERENCE SIGNS LIST 1 hybrid vehicle
2 engine
3 output shaft
4 first motor generator
5 second motor generator
6 drive wheel
7 drive shaft
8 first planetary gear mechanism
9 second planetary gear mechanism
19 first inverter
20 second inverter
21 DC-DC converter
22 contactor
23 battery
35 vehicle control unit
39 engine control means
40 battery management means
41 charge state calculation means
42 motor control means
43 standard opening and closing means
44 ignition switch
45 engine startup opening and closing means

The invention claimed is:

1. A hybrid vehicle which outputs power generated from an engine and a motor generator to a drive shaft through a power transmitting mechanism, the hybrid vehicle comprising:

an electricity storing means for exchanging power with the motor generator;

a contactor which enables or disables a connection between the motor generator and the electricity storing means;

a charge state calculation means for calculating a charge state of the electricity storing means;

a standard opening and closing means for turning off the contactor when the charge state calculated by the charge state calculation means is lower than a standard lower-limit value; and an engine startup opening and closing means for maintaining the contactor in an on state when an engine startup signal is input, even when the charge state calculated by the charge state calculation means is a value for turning off the contactor by the standard opening and closing means, wherein the contactor turning-on operation executed by the engine startup opening and closing means is executed when the charge state calculated by the charge state calculation means is higher than an engine startup lower-limit value which is lower than the standard lower-limit value by a predetermined value, and the engine is started by the motor generator.

2. The hybrid vehicle according to claim 1, wherein the contactor turning-on operation executed by the engine startup opening and closing means is stopped to turn off the contactor when the charge state does not exceed the standard lower-limit value within a predetermined time.

* * * * *